United States Patent
Wobak et al.

(10) Patent No.: US 11,411,611 B2
(45) Date of Patent: Aug. 9, 2022

(54) COMMUNICATION DEVICE AND METHOD FOR OPERATING THE SAME

(71) Applicant: NXP B.V., Eindhoven (NL)

(72) Inventors: Markus Wobak, Graz (AT); Ulrich Neffe, Albersdorf-Prebuch (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/158,081

(22) Filed: Jan. 26, 2021

(65) Prior Publication Data
US 2021/0250064 A1 Aug. 12, 2021

(30) Foreign Application Priority Data
Feb. 7, 2020 (EP) .................................... 20156033

(51) Int. Cl.
| | | |
|---|---|---|
| *H04B 5/00* | (2006.01) | |
| *H04B 7/00* | (2006.01) | |
| *H04B 1/38* | (2015.01) | |
| *H02J 5/00* | (2016.01) | |
| *H01Q 1/24* | (2006.01) | |
| *G06K 19/07* | (2006.01) | |

(52) U.S. Cl.
CPC ................... *H04B 5/0031* (2013.01)

(58) Field of Classification Search
None
See application file for complete search history.

(56) References Cited

U.S. PATENT DOCUMENTS

| | | | |
|---|---|---|---|
| 8,983,374 B2* | 3/2015 | Wiley | H04B 5/0037 455/41.1 |
| 9,240,824 B2* | 1/2016 | Hillan | H04B 5/00 |
| 9,553,637 B2* | 1/2017 | Yang | H04W 4/80 |
| 9,685,699 B2* | 6/2017 | Mahanfar | H01Q 1/243 |
| 10,079,621 B2* | 9/2018 | Lee | H01Q 1/243 |
| 10,396,583 B2* | 8/2019 | Maugars | H02J 7/025 |
| 10,944,446 B2* | 3/2021 | Hong | H04B 1/3888 |
| 10,958,094 B2* | 3/2021 | Choi | H02J 50/40 |
| 10,965,157 B2* | 3/2021 | Lee | H04B 5/0056 |
| 10,997,483 B2* | 5/2021 | Rizzo | H01Q 1/521 |
| 11,047,893 B2* | 6/2021 | Choi | G06F 1/1698 |

(Continued)

FOREIGN PATENT DOCUMENTS

CN 107547103 A 1/2018

OTHER PUBLICATIONS

ISO/IEC 14443; NFC Forum "Analog Parameter Comparison and Alignment"; Jan. 19, 2017, Version 1.5.

*Primary Examiner* — Tuan A Tran

(57) ABSTRACT

In accordance with a first aspect of the present disclosure, a communication device is provided, comprising: a first antenna configured to receive and transmit a first set of NFC signals, wherein said first set of NFC signals relates to NFC transactions; a second antenna configured to receive and transmit a second set of NFC signals, wherein said second set of NFC signals relates to wireless charging operations; a controller; and an antenna selection unit configured to select the first antenna or the second antenna in response to a selection signal received from said controller. In accordance with a second aspect of the present disclosure, a corresponding method for operating a communication device is conceived.

15 Claims, 8 Drawing Sheets

(56) References Cited

U.S. PATENT DOCUMENTS

| | | | |
|---|---|---|---|
| 2012/0139358 A1* | 6/2012 | Teggatz | H02J 50/12 307/104 |
| 2014/0273832 A1* | 9/2014 | Kim | H02J 50/20 455/41.1 |
| 2015/0065041 A1* | 3/2015 | Ahn | H04B 5/0031 455/41.1 |
| 2016/0190856 A1 | 6/2016 | Baek et al. | |
| 2016/0365743 A1 | 12/2016 | Huang et al. | |
| 2017/0098149 A1 | 4/2017 | Kesler et al. | |
| 2017/0279495 A1* | 9/2017 | Kim | H02J 50/10 |
| 2020/0274394 A1* | 8/2020 | Rhee | H04B 5/0075 |
| 2021/0314028 A1 | 10/2021 | Wobak et al. | |

* cited by examiner

COMMUNICATION DEVICE AND METHOD FOR OPERATING THE SAME

CROSS-REFERENCE TO RELATED APPLICATIONS

This application claims priority under 35 U.S.C. § 119 to European Patent Application No. 20156033.1, filed on Feb. 7, 2020, the contents of which are incorporated by reference herein.

TECHNICAL FIELD

The present disclosure relates to a communication device. Furthermore, the present disclosure relates to a corresponding method for operating a communication device.

BACKGROUND

Near field communication (NFC) is an established technology for proximity communication for various use cases. Using this technology, a primary device may generate a radio frequency (RF) field at a frequency of 13.56 MHz to power a secondary device. Modulation techniques are used to communicate in both directions. The secondary device may be a passive device (e.g. a tag or a transponder) or an active, typically battery-powered device. An RF field generated by an NFC reader can be used to charge the battery of the secondary device. This process is referred to as wireless charging. In such a scenario, the NFC communication channel may be used to control the charging operation.

SUMMARY

In accordance with a first aspect of the present disclosure, a communication device is provided, comprising: a first antenna configured to receive and transmit a first set of NFC signals, wherein said first set of NFC signals relates to NFC transactions; a second antenna configured to receive and transmit a second set of NFC signals, wherein said second set of NFC signals relates to wireless charging operations; a controller; and an antenna selection unit configured to select the first antenna or the second antenna in response to a selection signal received from said controller.

In one or more embodiments, the device further comprises a radio frequency (RF) matching unit and an NFC transceiver which are operatively coupled to each other, wherein said RF matching unit comprises the antenna selection unit.

In one or more embodiments, the antenna selection unit is configured to select the first antenna in a default condition.

In one or more embodiments, the antenna selection unit comprises digital control interfaces for selecting the first antenna or the second antenna, wherein selecting the first antenna or the second antenna comprises connecting said first antenna and second antenna, respectively, to a transmitter and/or receiver of the communication device.

In one or more embodiments, the antenna selection unit comprises a combined digital control interface for selecting the first antenna or the second antenna, wherein selecting the first antenna or second antenna comprises connecting said first antenna and second antenna, respectively, to both a transmitter and receiver of the communication device.

In one or more embodiments, the antenna selection unit is configured to insert a low attenuation on a selected antenna path.

In one or more embodiments, the antenna selection unit is configured to drive a predefined load impedance state of an unselected antenna path.

In one or more embodiments, the controller is configured to generate the selection signal based on a result of a detection process.

In one or more embodiments, the detection process comprises transmitting radio frequency (RF) pulses and/or RF polling commands through the first antenna or the second antenna, to detect the presence of an external communication device.

In one or more embodiments, the RF pulses and/or RF polling commands are transmitted during configurable intervals.

In one or more embodiments, transmitting the RF pulses and/or RF polling commands is repeated for a configurable number of times during said intervals.

In one or more embodiments, the number of times is configurable for the first antenna and for the second antenna.

In one or more embodiments, one or more signals of the second set of NFC signals transfer power to an external communication device.

In one or more embodiments, the device comprises at least one further antenna, said further antenna being configured to receive and transmit a further set of NFC signals, wherein said further set of NFC signals relates to wireless charging operations, and wherein the antenna selection unit is configured to select the first antenna, the second antenna or the further antenna in response to the selection signal.

In accordance with a second aspect of the present disclosure, a method for operating a communication device is conceived, the method comprising: receiving and transmitting, by a first antenna, a first set of NFC signals, wherein said first set of NFC signals relates to NFC transactions; receiving and transmitting, by a second antenna, a second set of NFC signals, wherein said second set of NFC signals relates to wireless charging operations; selecting the first antenna or the second antenna in response to a selection signal received from a controller.

DESCRIPTION OF DRAWINGS

Embodiments will be described in more detail with reference to the appended drawings, in which.

DESCRIPTION OF EMBODIMENTS

Near field communication (NFC) is an established technology for proximity communication for various use cases.

Using this technology, a primary device may generate a radio frequency (RF) field at a frequency of 13.56 MHz to power a secondary device. Modulation techniques are used to communicate in both directions. The secondary device may be a passive device (e.g. a tag or a transponder) or an active, typically battery-powered device. An RF field generated by an NFC reader can be used to charge the battery of the secondary device. This process is referred to as wireless charging. In such a scenario, the NFC communication channel may be used to control the charging operation.

Typical implementations of NFC direct wireless charging make use of a WLC-P (wireless charging poller) device and a WLC-L (wireless charging listener) device. The wireless charging poller may be a standalone reader device which is configured to charge the battery of the wireless charging listener, i.e. a secondary accessory device like a watch or fitness tracker. The requirements for the antenna size and the placement of the antenna in wireless charging (WLC) use cases is often at odds with typical NFC use cases (such as NFC payment, ticketing, access or tag reading). Typical WLC accessory devices have a small form factor and require small WLC antenna sizes for a high-power efficiency. Thus, using a regular NFC antenna, such as an antenna used in a mobile phone, is typically not preferable. In other words, in addition to a regular NFC antenna, a reader (e.g., a mobile phone) should be equipped with a smaller antenna for wireless charging. In that case, the reader should then typically contain an additional controller, which increases the cost of the reader.

Now discussed are a communication device and a corresponding method of operating a communication device, which facilitate the use of two or more different NFC antennas, specifically the use of antennas for regular NFC transactions and for wireless charging operations. Examples of regular NFC transactions include payment transactions and public transport ticket validations, which are carried out when an NFC-enabled mobile device (e.g., a phone) is within close proximity of an NFC-enabled terminal.

Figure 1:
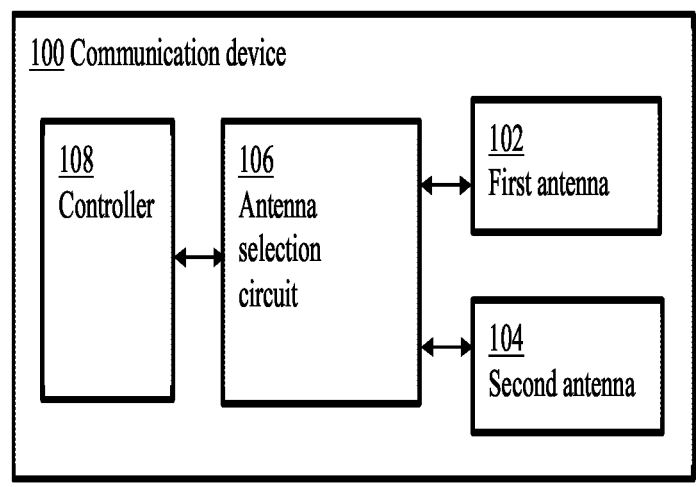
FIG. 1 shows an illustrative embodiment of a communication device.

FIG. 1 shows an illustrative embodiment of a communication device 100. The communication device 100 comprises a first antenna 102, a second antenna 104, an antenna selection circuit 106 and a controller 108. The first antenna 102 is configured to receive and transmit a first set of NFC signals relating to NFC transactions, and the second antenna 104 is configured to receive and transmit a second set of NFC signals relating to wireless charging operations. Furthermore, the antenna selection unit is configured to select the first antenna or the second antenna in response to a selection signal received from the controller. In this way, the use of two or more different NFC antennas can be facilitated.

Figure 2:
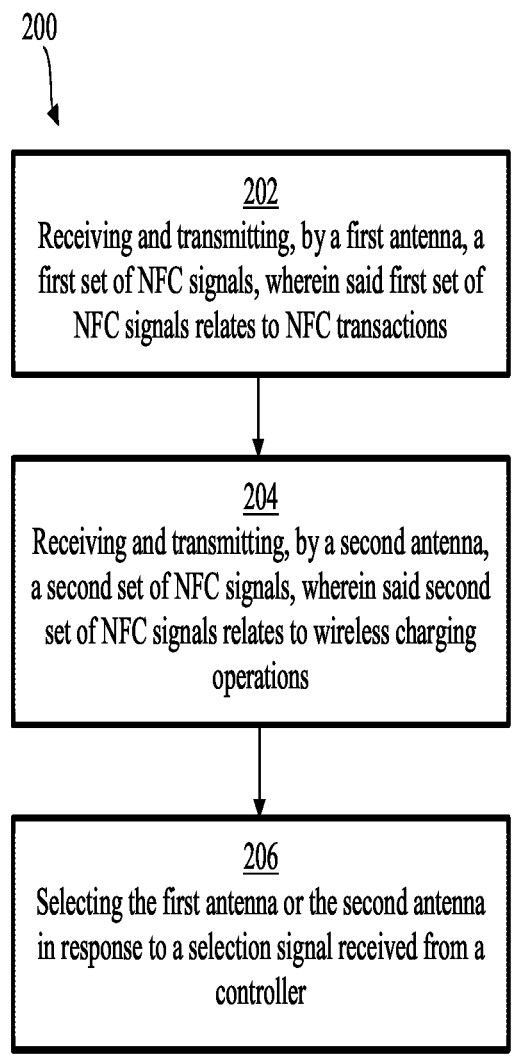
FIG. 2 shows an illustrative embodiment of a method of operating a communication device.

FIG. 2 shows an illustrative embodiment of a method 200 of operating a communication device. The method 200 comprises, at 202, receiving and transmitting, by a first antenna, a first set of NFC signals, wherein said first set of NFC signals relates to NFC transactions. Furthermore, the method 200 comprises, at 204, receiving and transmitting, by a second antenna, a second set of NFC signals, wherein said second set of NFC signals relates to wireless charging operations. Finally, the method 200 comprises, at 206, selecting the first antenna or the second antenna in response to a selection signal received from a controller.

In a practical implementation, the communication device further comprises a radio frequency (RF) matching unit and an NFC transceiver which are operatively coupled to each other, wherein the RF matching unit comprises the antenna selection unit. Furthermore, in one or more embodiments, the antenna selection unit is configured to select the first antenna in a default condition. In this way, NFC transactions may be performed as quickly as possible. In a practical implementation, the antenna selection unit comprises digital control interfaces for selecting the first antenna or the second antenna, wherein selecting the first antenna or the second antenna comprises connecting said first antenna and second antenna, respectively, to a transmitter and/or receiver of the communication device. In an alternative practical implementation, the antenna selection unit comprises a combined digital control interface for selecting the first antenna or the second antenna, wherein selecting the first antenna or second antenna comprises connecting said first antenna and second antenna, respectively, to both a transmitter and receiver of the communication device.

In one or more embodiments, the antenna selection unit is configured to insert a low attenuation on a selected antenna path. In this way, a good power efficiency may be achieved from the transmitter to the antenna. More specifically, the consumed transmit power should primarily be used to generate the radio frequency field and not be dissipated within the matching and switching circuitry. By inserting a low attenuation on the selected antenna path, such dissipation may be avoided. The skilled person will appreciate that this feature may be realized by a proper choice of the matching topology and switching circuitry and a proper selection of a switching component. For example, the on-resistance of a switch should be low to achieve a low attenuation.

In one or more embodiments, the antenna selection unit is configured to drive a predefined load impedance state of an unselected antenna path. In this way, a deterministic detection sensitivity may be achieved. More specifically, the unselected antenna may form part of a radio frequency field detection network. By driving a predefined load impedance state of the unselected antenna path, the detection sensitivity of the network may become deterministic. The skilled person will appreciate that this feature may be realized by a proper choice of the matching topology, for example a proper placement of a switching component.

In one or more embodiments, the controller may be configured to generate the selection signal based on a result of a detection process. In particular, the detection process may be used to detect the presence of an external communication device in proximity of the first antenna and/or the second antenna. In this way, the first antenna and/or second antenna can quickly be selected, to start performing transactions and/or operations through said antenna without a significant delay. The detection process may comprise transmitting RF pulses—for example using low-power card detection (LPCD) techniques—and/or RF polling commands through the first antenna or the second antenna, to detect the presence of an external communication device. This results in practical implementation. Furthermore, the use of RF pulses facilitates reducing the power consumption of the communication device. In one or more embodiments, the RF pulses and/or polling commands are transmitted during configurable intervals. Furthermore, transmitting the RF pulses and/or RF polling commands may be repeated for a configurable number of times during said intervals. In particular, said number of times may be configurable for the first antenna and for the second antenna. In other words, the number of times the RF pulses or polling commands are repeated within a given interval can be different for the first antenna and second antenna. In this way, the flexibility of the detection process may be increased. For instance, a higher priority may be given to detecting external communication devices either through the first antenna or through the second antenna. Furthermore, one or more signals of the second set of NFC signals may transfer power to an external communication device. In this way, the second antenna may effectively be used for a wireless transfer of power to an external device to be charged.

It is noted that the communication device may include more than two antennas, for example an antenna for performing regular NFC transactions and a plurality of antennas for charging different types of external communication devices. In this way, the system can be extended to cover various use cases. Thus, in one or more embodiments, the communication device comprises at least one further antenna, said further antenna being configured to receive and transmit a further set of NFC signals, wherein said further set of NFC signals relates to wireless charging operations, and the antenna selection unit is configured to select the first antenna, the second antenna or the further antenna in response to the selection signal.

Figure 3:
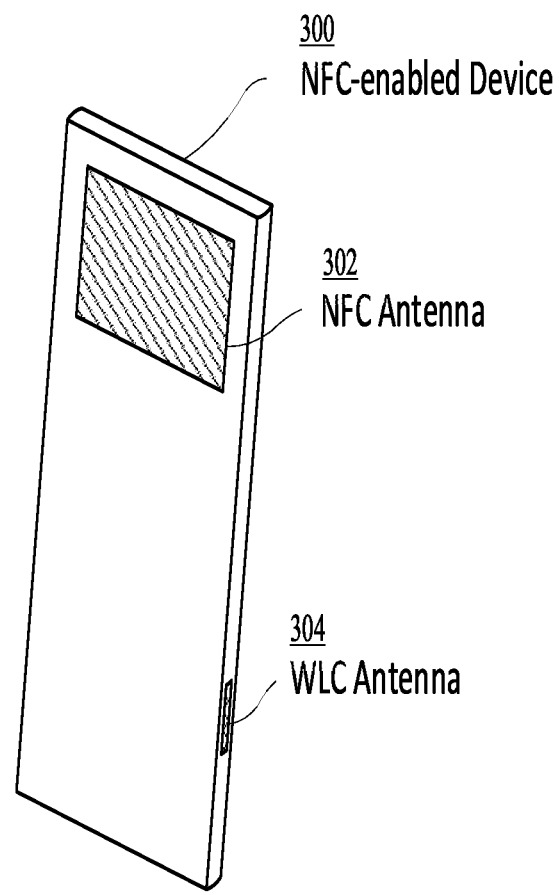
FIG. 3 shows an illustrative embodiment of an NFC-enabled device.

FIG. 3 shows an illustrative embodiment of an NFC-enabled device 300. The NFC-enabled device 300 comprises a first antenna, i.e. an NFC antenna 302 for carrying out regular NFC transactions and a second antenna, i.e. a wireless charging antenna 304 for carrying out wireless charging operations. The second antenna may be an NFC antenna that is specifically designed for wireless charging operations, having a smaller form factor than a regular NFC antenna. In accordance with the present disclosure, a single NFC controller may be connected to NFC and wireless charging (WLC) antennas. Furthermore, device detection may be performed on the different links, i.e. through the different antennas. This allows a mobile device, such as a mobile phone, to support regular NFC use cases as well as WLC poller use cases with optimized WLC antennas. Furthermore, in accordance with the present disclosure, antenna switching concepts with combined and separated links for transmission and reception interface may be conceived. In particular, a single primary NFC device may be operated in a time-multiplexed manner, for supporting regular NFC use cases on an NFC antenna and for supporting wireless charging use cases on at least one second WLC antenna. This allows adding WLC use cases to mobile devices with NFC support without adding an additional NFC controller and allows to control RF concurrency between both RF antenna links. A detection process may be carried out to detect a counterpart device on one or the other RF link.

Figure 4:
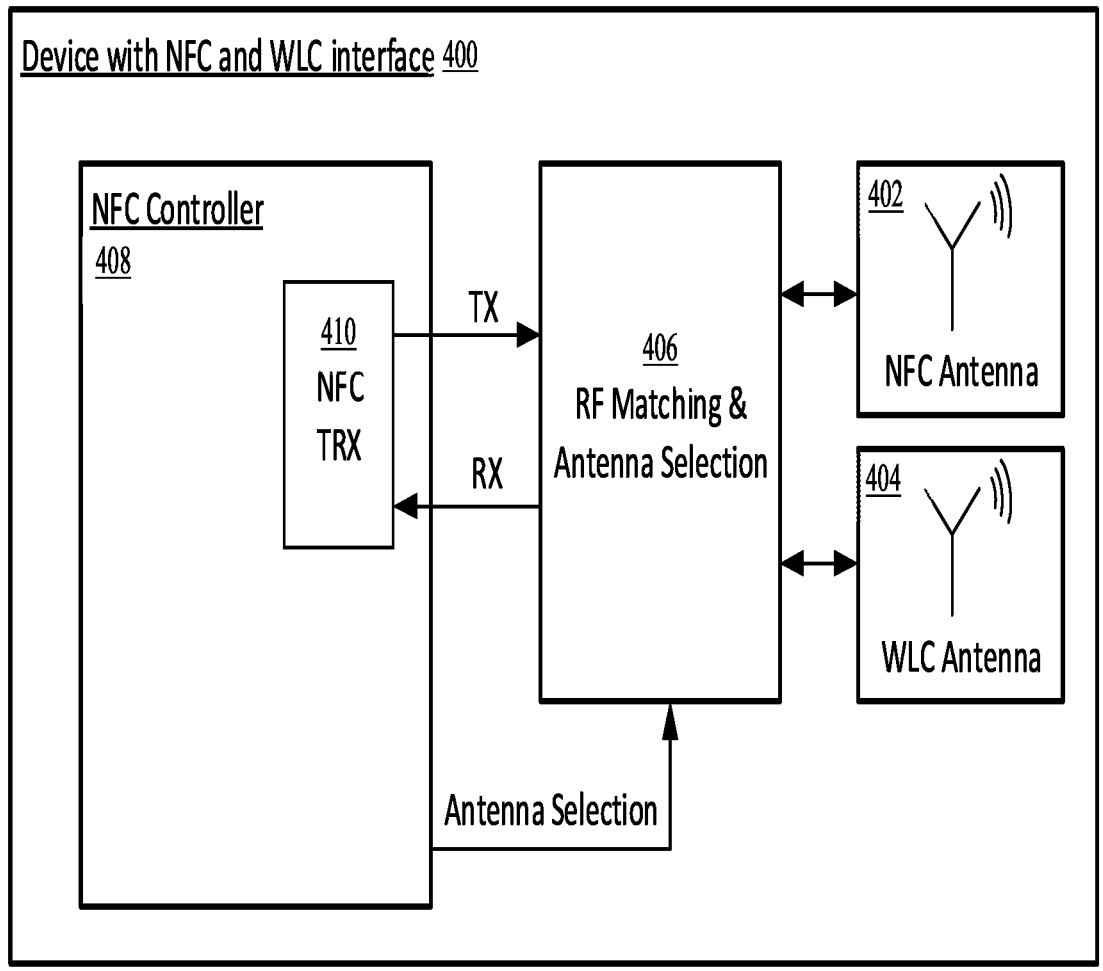
FIG. 4 shows an illustrative embodiment of a communication device with an NFC interface and a wireless charging interface.

FIG. 4 shows an illustrative embodiment of a communication device 400 with an NFC interface and a wireless charging interface. The device 400 comprises an NFC antenna 402 and a wireless charging antenna 404, both of which are operatively coupled to an RF matching and antenna selection unit 406. The RF matching and antenna selection unit 406 is operatively connected to an NFC transceiver unit 410, which is included in an NFC controller 408 of the device 400. In accordance with the present disclosure, the RF matching and antenna selection unit 406 is configured to select the NFC antenna 402 or the wireless charging antenna 404 in response to an antenna selection signal received from the NFC controller 408. In particular, the RF modem (i.e., the NFC transceiver 410) of the NFC controller 408 is connected to a combined RF matching circuit for both antennas. A selection interface may define which antenna is connected to the RF modem. The default selection may be to connect the NFC antenna 402 to the NFC controller 408 (to enable regular NFC use cases). During a detection process for detecting an external device to be charged, as well as during a wireless charging operation, the wireless charging antenna 404 is connected to the RF modem.

Figure 5:
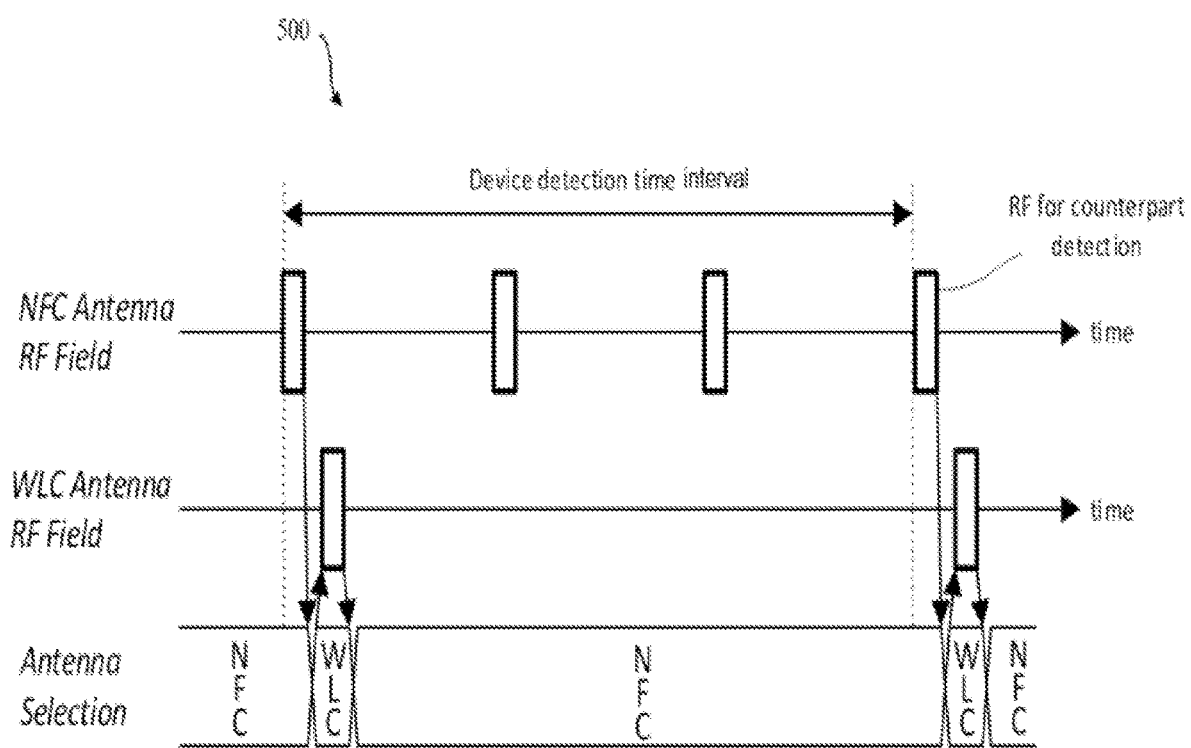
FIG. 5 shows an illustrative embodiment of a detection process.

FIG. 5 shows an illustrative embodiment of a detection process 500. During a device detection phase, the NFC controller may be searching for communication counterparts on all connected antennas. Detection methods like low-power card detection (LPCD) may be used, by means of which short RF sense pulses are transmitted, to detect load changes indicating the presence of counterparts. The poll interval timings can be set for each antenna independently. Once a counterpart is detected, communication with the counterpart or wireless charging of the counterpart can be initiated. An example of a poll interval with three polls for an NFC counterpart and one poll for a wireless charging counterpart per time interval is shown in FIG. 5. The time interval may for example be one second.

Figure 6:
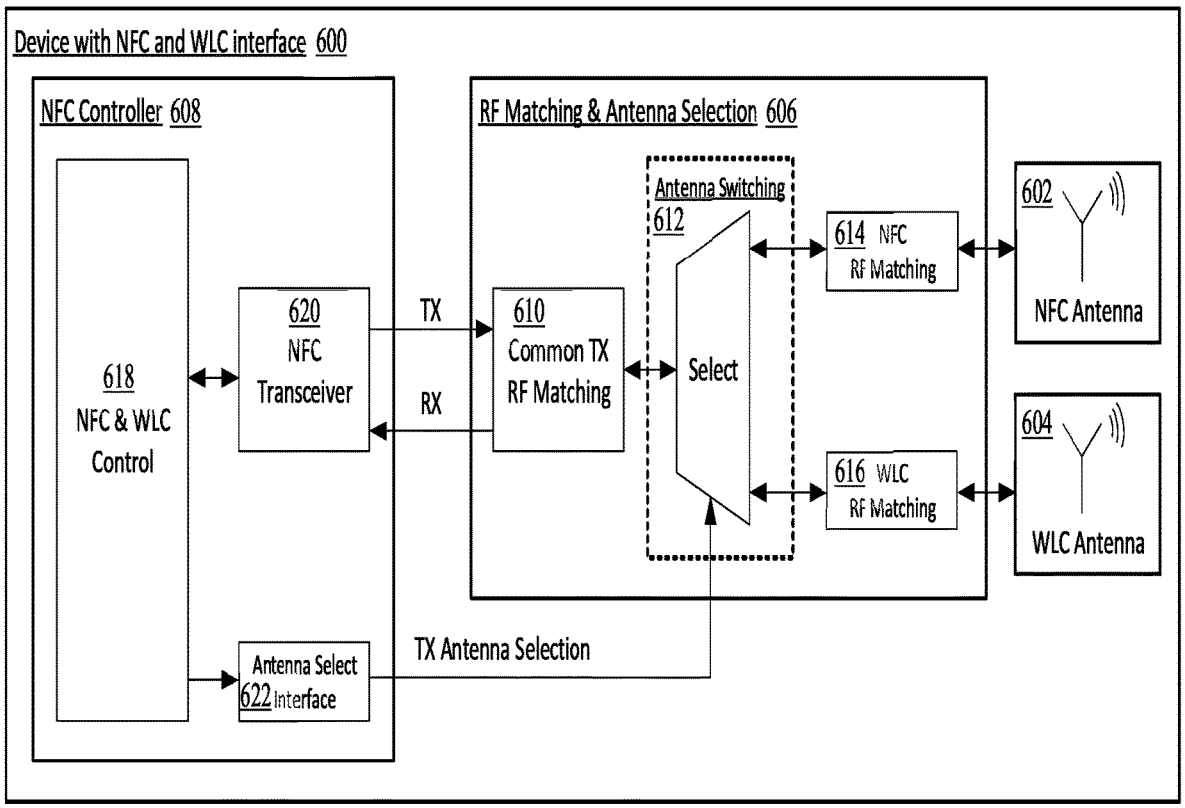
FIG. 6 shows another illustrative embodiment of a communication device with an NFC interface and a wireless charging interface.
Figure 7:
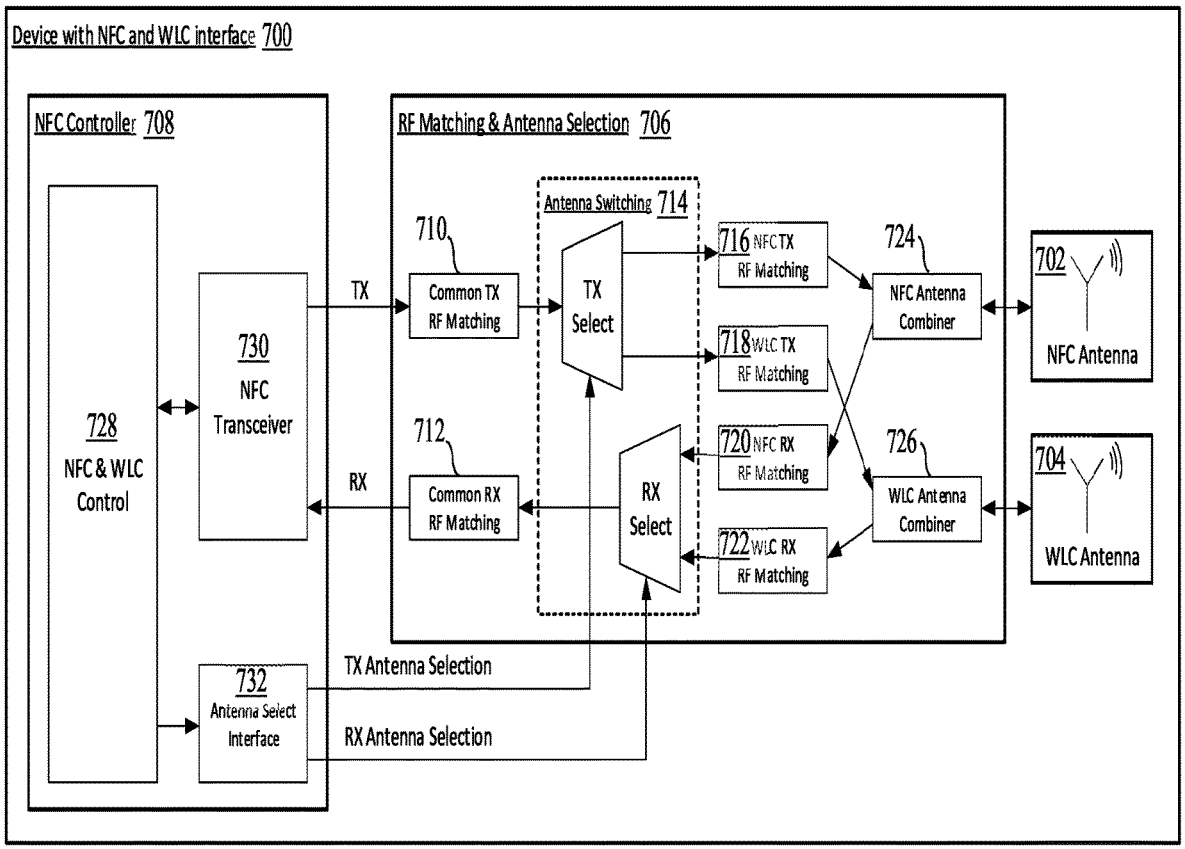
FIG. 7 shows a further illustrative embodiment of a communication device with an NFC interface and a wireless charging interface.

FIG. 6 shows another illustrative embodiment of a communication device 600 with an NFC interface and a wireless charging interface. The communication device 600 comprises an NFC antenna 602 and a wireless charging antenna 604 which are operatively coupled to an RF matching and antenna selection unit 606. The RF matching and antenna selection unit 606 is operatively coupled to an NFC transceiver 620, which is comprised in an NFC controller 608. The RF matching and antenna selection unit 606 comprises a common part and an antenna-specific part. The antenna can be switched by means of a multiplexer comprised in an antenna switching block 612. The multiplexer received an antenna selection signal as an input; said antenna selection signal is provided by an NFC and wireless charging control unit 618 through an antenna selection interface 622. The RF modem transmission and reception connection can be commonly connected to the antennas (as shown in FIG. 6) or can be set independently (as shown in FIG. 7). The antenna selection unit may insert a low attenuation on the selected antenna. Furthermore, the antenna selection unit may terminate the unselected antenna or antennas with a predefined load impedance. It is noted that the presently disclosed concept can be expanded to support more than two antennas. This could be used to support different wireless charging antennas optimized for various accessories. The antenna selection interface may be a digital bus interface coding which antenna to be selected. The antenna selection unit can be implemented with various components, including metal-oxide-semiconductor (MOS) transistors, silicon-on-insulator (SOI) switches, RF switches and/or analog switches.

FIG. 7 shows a further illustrative embodiment of a communication device 700 with an NFC interface and a wireless charging interface. The communication device 700 comprises components similar to those shown in FIG. 6. The communication device 700 comprises an NFC antenna 702 and a wireless charging antenna 704 which are operatively coupled to an RF matching and antenna selection unit 706. The RF matching and antenna selection unit 706 is operatively coupled to an NFC transceiver 730, which is comprised in an NFC controller 708. The RF matching and antenna selection unit 706 comprises a common part and an antenna-specific part. The antenna can be switched by means of multiplexers comprised in an antenna switching block 714. The multiplexers receive an antenna selection signal as an input; said antenna selection signal is provided by an NFC and wireless charging control unit 728 through an antenna selection interface 732. The RF modem transmission and reception connections are set independently.

Figure 8:
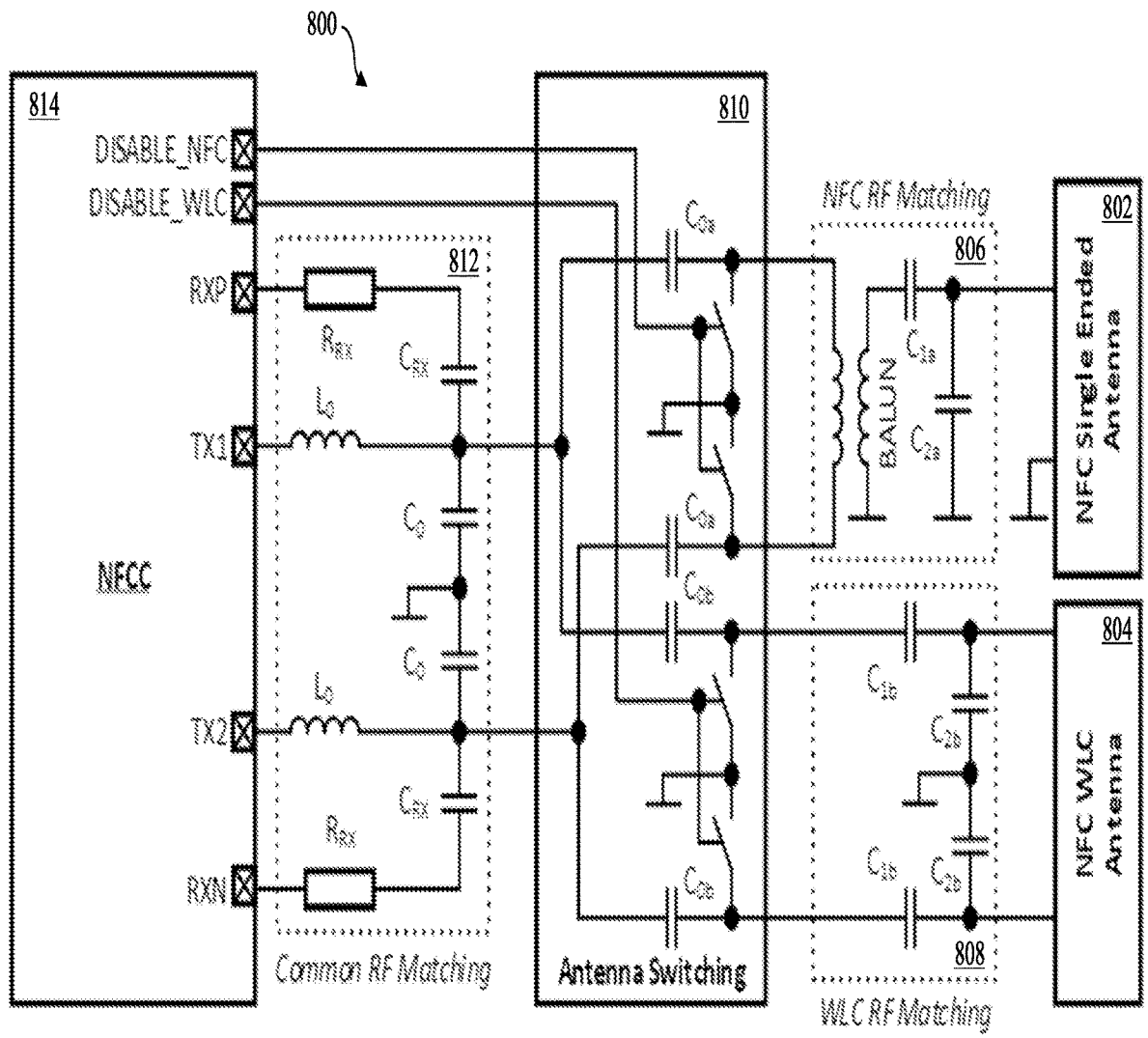
FIG. 8 shows a further illustrative embodiment of a communication device with an NFC interface and a wireless charging interface.

FIG. 8 shows a further illustrative embodiment of a communication device 800 with an NFC interface and a wireless charging interface. In particular, a possible implementation is shown of the communication device shown in FIG. 6. It is noted that the presently disclosed device and method are not limited to this implementation. In particular, the skilled person will appreciate that other implementations are possible too, either based on the communication device shown in FIG. 6 or the communication device shown in FIG. 7. The communication device 800 comprises a single ended NFC antenna 802 and a wireless charging antenna 804 which are operatively coupled to an NFC RF matching circuit 806, respectively a wireless charging RF matching circuit 808. The NFC RF matching circuit 806 and wireless charging RF matching circuit 808 are operatively coupled to an antenna switching block 810, which is in turn operatively coupled to a common RF matching circuit 812. An NFC controller 814 is operatively coupled to both the common RF matching circuit 812 and the antenna switching block 810 and is configured to send control signals to the antenna switching block, in order to disable the NFC interface or the wireless charging interface.

In particular, FIG. 8 shows a possible application circuit, which connects a single NFC controller 814 with a differential ended RF modem to an NFC antenna 802 and a wireless charging antenna 804. This example uses a single ended NFC antenna 802 and a differential ended wireless charging antenna 804. However, it is noted that the presently disclosed device and method can be implemented using other types of antennas as well, i.e. both the NFC antenna and the wireless charging antenna can be single ended, or differential ended. Typically, a NFC controller is connected to a single antenna interconnect subblock (i.e., a common RF matching circuit), which is in turn connected to an antenna-specific antenna matching subblock. In accordance with the present disclosure, an antenna switching subblock 810 is added, in order to select only one active antenna from a set of two or more antennas. The antenna switching subblock 810 comprises a plurality of switches being configured to disconnect an unused antenna from the RF modem by connecting the relevant paths to ground potential. The switches can be implemented using RF switching devices which support electrical signal levels for NFC and wireless charging use cases (RF switches, NMOS transistors, etc.). Control signals DISABLE_NFC and DISABLE_WLC for the NFC controller enable the latter control the switches. More specifically, the switches of the antenna that should be disconnected can be closed, in order to short series capacitors $C_{0a}$ or $C_{0b}$ to ground. Control signals for the NFC controller enable the switches of the antenna to be disconnected to short series capacitors $C_{0a}$ or $C_{0b}$ to ground. This will put them in parallel to main EMC capacitor $C_0$. Thus, either DISABLE_NFC or DISABLE_WLC may be active, in order to connect only one antenna at a time to the RF modem.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 communication device
102 first antenna
104 second antenna
106 antenna selection circuit
108 controller
200 method operating a communication device
202 receiving and transmitting, by a first antenna, a first set of NFC signals, wherein said first set of NFC signals relates to NFC transactions
204 receiving and transmitting, by a second antenna, a second set of NFC signals, wherein said second set of NFC signals relates to wireless charging operations;
206 selecting the first antenna or the second antenna in response to a selection signal received from a controller
300 NFC-enabled device
302 near field communication antenna
304 wireless charging antenna
400 communication device with NFC interface and wireless charging interface
402 NFC antenna
404 wireless charging antenna
406 RF matching and antenna selection unit
408 NFC controller
410 NFC transceiver
500 detection process
600 communication device with NFC interface and wireless charging interface
602 NFC antenna
604 wireless charging antenna
606 RF matching and antenna selection unit 608 NFC controller
610 common transmitter and receiver RF matching circuit
612 antenna switching block
614 NFC RF matching circuit
616 wireless charging RF matching circuit
618 NFC and wireless charging control unit
620 NFC transceiver
622 antenna selection interface
700 communication device with NFC interface and wireless charging interface
702 NFC antenna
704 wireless charging antenna
706 RF matching and antenna selection unit
708 NFC controller
710 common transmitter RF matching circuit
712 common receiver RF matching circuit
714 antenna switching block
716 NFC transmitter RF matching circuit
718 wireless charging transmitter RF matching circuit
720 NFC receiver RF matching circuit
722 wireless charging receiver RF matching circuit
724 NFC antenna combiner
726 wireless charging antenna combiner
800 communication device with NFC interface and wireless charging interface
802 NFC single ended antenna
804 NFC wireless charging antenna
806 NFC RF matching circuit
808 wireless charging RF matching circuit
810 antenna switching block
812 common RF matching circuit
814 NFC controller

The invention claimed is:

1. A communication device, comprising:
a first antenna configured to receive and transmit a first set of NFC signals, wherein said first set of NFC signals relates to NFC transactions;
a second antenna configured to receive and transmit a second set of NFC signals, wherein said second set of NFC signals relates to wireless charging operations;
a controller; and
an antenna selection unit configured to select the first antenna or the second antenna in response to a selection signal received from said controller, wherein the selection signal is based on a result of a detection process, wherein the detection process comprises alternately selecting the first antenna for a first configurable time interval and the second antennal for a second configurable time interval to transmit radio frequency (RF) pulses and/or polling commands through the first and second antennas during the first and second configurable time intervals to detect the presence of an external communication device, wherein the first antenna or the second antenna is selected in response to the detection of the presence of the external communication device, wherein the first and second configurable time intervals are separately configurable, and wherein transmitting the RF pulses and/or RF polling commands is repeated for a configurable number of times during said first and second configurable time intervals.

2. The device of claim 1, further comprising a radio frequency, RF, matching unit and an NFC transceiver which are operatively coupled to each other, and wherein said RF matching unit comprises the antenna selection unit.

3. The device of claim 1, wherein the antenna selection unit is configured to select the first antenna in a default condition.

4. The device of claim 1, wherein the antenna selection unit comprises digital control interfaces for selecting the first antenna or the second antenna, wherein selecting the first antenna or the second antenna comprises connecting said first antenna and second antenna, respectively, to a transmitter and/or receiver of the communication device.

5. The device of claim 1, wherein the antenna selection unit comprises a combined digital control interface for selecting the first antenna or the second antenna, wherein selecting the first antenna or second antenna comprises connecting said first antenna and second antenna, respectively, to both a transmitter and receiver of the communication device.

6. The device of claim 1, wherein the antenna selection unit is configured to insert a low attenuation on a selected antenna path.

7. The device of claim 1, wherein the antenna selection unit is configured to drive a predefined load impedance state of an unselected antenna path.

8. The device of claim 1, wherein one or more signals of the second set of NFC signals transfer power to an external communication device.

9. The device of claim 1, comprising at least one further antenna, said further antenna being configured to receive and transmit a further set of NFC signals, wherein said further set of NFC signals relates to wireless charging operations, and wherein the antenna selection unit is configured to select the first antenna, the second antenna or the further antenna in response to the selection signal.

10. A method for operating a communication device, comprising:
receiving and transmitting, by a first antenna, a first set of NFC signals, wherein said first set of NFC signals relates to NFC transactions;
receiving and transmitting, by a second antenna, a second set of NFC signals, wherein said second set of NFC signals relates to wireless charging operations;
selecting the first antenna or the second antenna in response to a selection signal received from a controller, wherein the selection signal selects the first antenna or the second antenna in response to a detection process, wherein the detection process comprises alternately selecting the first antenna for a first configurable time interval and the second antennal for a second configurable time interval to transmit radio frequency (RF) pulses and/or polling commands through the first and second antennas during the first and second configurable time intervals to detect the presence of an external communication device, wherein the first antenna or the second antenna is selected in response to the detection of the presence of the external communication device, wherein the first and second configurable time intervals are separately configurable, and wherein transmitting the RF pulses and/or RF polling commands is repeated for a configurable number of times during said first and second configurable time intervals.

11. The method of claim 10, wherein the antenna selection unit selects the first antenna in a default condition.

12. The method of claim 10, wherein the antenna selection unit comprises digital control interfaces for selecting the first antenna or the second antenna, wherein selecting the first antenna or the second antenna comprises connecting said first antenna and second antenna, respectively, to a transmitter and/or receiver of the communication device.

13. The method of claim 10, wherein the antenna selection unit comprises a combined digital control interface for selecting the first antenna or the second antenna, wherein selecting the first antenna or second antenna comprises connecting said first antenna and second antenna, respectively, to both a transmitter and receiver of the communication device.

14. The method of claim 10, wherein the antenna selection unit inserts a low attenuation on a selected antenna path.

15. The method of claim 10, wherein the antenna selection unit drives a predefined load impedance state of an unselected antenna path.

* * * * *